April 20, 1965　　J. F. H. CUSTERS ETAL　　3,178,773
SEALING MATERIAL
Filed July 20, 1961
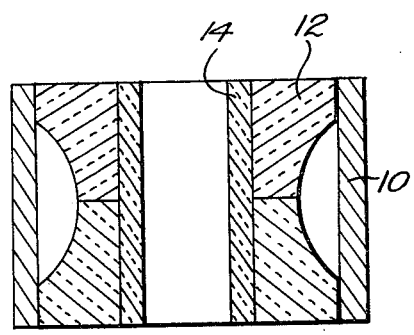

United States Patent Office 3,178,773
Patented Apr. 20, 1965

3,178,773
SEALING MATERIAL
Jan F. H. Custers, Bernard W. Senior, Henry B. Dyer, and Peter T. Wedepohl, all of Johannesburg, Transvaal, Republic of South Africa, assignors to Adamant Laboratories (Proprietary) Limited
Filed July 20, 1961, Ser. No. 125,564
1 Claim. (Cl. 18—34)

This invention relates to the naturally occurring mineral, wonderstone or pyrophyllite, which is used as a pressure-transmitting medium in many types of high pressure equipment, and which is also used as an electrical and thermal insulator in high pressure cavities.

The particular virtue of pyrophyllite is that it combines the qualities of high internal friction and good electrical and thermal insulation that are required in high-pressure techniques, but in its natural state its friction is apt to be somewhat variable. The first object of the invention is to provide a method of increasing and homogenizing the friction of pyrophyllite and thereby rendering it more suitable for high-pressure applications in that the load at which a given pressure can be generated is substantially reduced relatively to untreated pyrophyllite. The second object is to increase the thermal insulation, again to improve the value of wonderstone in high-pressure applications.

According to the invention, then, a process of conditioning a solid, naturally occurring pyrophyllite workpiece to improve its suitability for high-pressure applications consists in heating the workpiece to a temperature between 450° and 750° C., for a period in excess of the time necessary for the workpiece to become homogeneously heated.

As in other processes involving heat treatment of materials (e.g., the heat treatment of steel) the time required for the reaction depends on the temperature of the treatment, the mass of the workpiece, its thickness and thermal conductivity. Thus, in the instant case, a longer time is necessary when using a lower temperature than when using a higher temperature.

Further according to the invention, there is provided a composite cladding to a pressure cavity, illustrated in the drawing which is a vertical section through part of a pressure chamber.

In order to illustrate the improvement effected by the method of the invention, a series of tests will be described, in which the wonderstone was used as a pressure medium in a high-pressure die of the kind comprising a central cavity filled with a shaped wonderstone tube within which is contained the charge to be subjected to high pressure together with any suitable means of heating the charge.

Two opposed conical anvils are brought to bear upon the flat end faces of the pyrophyllite tube containing the charge. As the load exerted on the tube by the anvils is increased from zero the pyrophyllite of the tube is forced to extrude into the annular gap between each conical anvil face and the adjacent die face. As the load is further increased pyrophyllite in the gap extrudes further, permitting the opposed anvil faces to advance and thus to generate further pressure in the pyrophyllite plus the charge within the die cavity.

The mechanical properties of the pyrophyllite must be such that the pressure required for extrusion is neither too large nor too small. If the pressure required is too large, an undue proportion of the applied load will be borne by the extruded material in the annular gap. If the pressure required is too low extrusion from the pressure cavity radially outwards will occur thus preventing the generation of adequate pressure within the cavity.

It is further desirable that the pressure required for extrusion be the same from one specimen of pyrophyllite to the next so that reproducible pressure behaviour and pressure generation occurs each time the apparatus is used. Pyrophyllite being a natural mineral is subject to quite wide variations in chemical composition and physical properties.

It has been found experimentally that the extrusion pressure also varies in a like manner. The evidence for this is that it has been found that there is a wide variation in the load applied to the anvils in the device described above which is required to generate a specific pressure with the pressure cavity as measured by a well-known change in electrical resistance of a metal such as barium which at room temperature occurs at a fixed pressure. Results for a device with a cavity of minimum diameter 0.5 inch are set out in Table I. These results refer to pyrophyllite in its natural state, and pyrophyllite which has been heated for various times at various temperatures. The pyrophyllite tubes were heat treated after forming to the desired shape, due allowance having been made for the known dimensional changes which occur with this material when it is heated.

Table I.—*Applied load required to generate a pressure defined by the change in electrical resistance of barium metal at about 60 kilo bars*

| Nature of Treatment | Number of Experiments | Mean Applied Load, tons | Standard Deviation from the mean, percent |
|---|---|---|---|
| No heat treatment | 10 | 180.5 | 4.8 |
| 750° C. for 16 hours | 2 | 146.0 | |
| 750° C. for 4½ hours | 4 | 147.5 | 1.6 |
| 750° C. for 1¼ hours | 6 | 143.2 | 1.4 |
| 650° C. for 16 hours | 3 | 138.5 | |
| 650° C. for 5½ hours | 2 | 138.5 | |
| 650° C. for 2 hours | 4 | 136.5 | 1.1 |
| 550° C. for 6 hours | 3 | 138.9 | |
| 550° C. for 2 hours | 3 | 143.2 | |
| 450° C. for 16 hours | 2 | 158.7 | |

The weight of the tubes in this series of experiments was 1.1 grams each.

It is seen that the effect of heat treatment is to reduce substantially the load at which a given pressure can be generated, and at the same time to reduce the variation in load for a given pressure over a number of individual pressure runs. Furthermore, while any heat treatment within the range tested—i.e. 450° C. for 16 hours to 900° C. for 16 hours—is helpful, the optimum heat treatment consists in heating with the range 550° C. to 750° C. for a period of time between two and six hours.

This specification of time and temperature is for pyrophyllite components of about the weight quoted. It is found that when bigger pieces of pyrophyllite are heat treated either the time or the temperature or both must be increased slightly. Thus while it is preferred to heat tubes weighing about one gram for two hours at 650° C., it is better to heat tubes weighing about 2.5 grams at 650° C., for three hours. For large pyrophyllite pieces care must be exercised in the method of heat treatment, for if the rate of increase of temperature of the pyrophyllite is too rapid, or is not about the same at all points within the pyrophyllite piece, spalling or cracking may occur.

To avoid the difficulties inherent in there being a permanent change of dimensions as a result of heat treatment, it is convenient to heat the pyrophyllite in the form of roughly shaped rods or cylinders from which many pieces of the desired form can be machined after heat treatment. In a typical series of tests using a high pressure apparatus of larger size the following results were obtained:

Dimensions of pyrophyllite cylinders heated:
8 inches long; 1⅛ inches outside diameter; ⅞₆ inch inside diameter.

| Temperature, °C. | Time, hrs. | Number of Experiments | Mean Applied Load to Achieve Barium Transition, tons |
|---|---|---|---|
| 650 | 4 | 3 | 312 |
| 650 | 8 | 3 | 286 |
| 650 | 12 | 3 | 276 |
| 650 | 16 | 3 | 273 |
| 675 | 4 | 6 | 275 |
| 675 | 8 | 6 | 267 |
| 675 | 12 | 3 | 254 |

It can be seen that for pyrophyllite cylinders of this size heating for about eight to twelve hours at 675° C. yields an optimum result.

It is preferable not to heat the cylinders to very high temperatures in this application where subsequent shaping of the finished component must be done as the pyrophyllite becomes harder and more difficult to machine as the temperature of heating is increased.

It is further an advantage to heat the pyrophyllite to effect an increase in the thermal insulation provided by the pyrophyllite. It has been found that heating to a temperature which is in excess of 750° C., and preferably at 900° C., for about 16 hours is necessary to improve the heat insulation properties.

As a specific example, to heat a charge to a given temperature using untreated pyrophyllite within the pressure cavity required 1.55 kilowatts. When the pyrophyllite had been heated at 900° C. for 16 hours, the power required to achieve the same temperature was only 1.25 kilowatts.

From the data quoted it can be seen that the desired treatment for optimum high pressure properties is not the same as that for optimum thermal insulation properties.

The invention further provides a composite cladding to a pressure cavity, the inner part of the cladding consisting of a shell of pyrophyllite material heat treated between 750° C. and 900° C. for about 16 hours to optimum insulating properties and the outer shell of pyrophyllite heat treated between 450° and 750° C. for a period in excess of 2 hours to optimum frictional properties.

This cladding is illustrated in the drawing. In the drawing 10 represents the wall of the chamber. 12 is a pyrophyllite cylinder heated by the method of the invention to obtain optimum frictional properties. 14 is a bushing of pyrophyllite heated by the method of the invention to obtain optimum heat-insulating properties.

It is to be noted that the heating of pyrophyllite results in a permanent alteration of the dimensions of the material so that allowances have to be made when designing parts. Heating at 650° C. for two hours causes a linear expansion of about 0.5% and at 900° C. for 16 hours a linear expansion of about 1.5%.

We claim:

A composite cladding for a pressure chamber, comprising an outer shell consisting essentially of solid, naturally occurring pyrophyllite that has been heated to a temperature between 450° C. and 750° C. for a period in excess of two hours, and an inner bushing consisting essentially of solid, naturally occurring pyrophyllite that has been heated to a temperature between 750° C. and 900° C. for a period of about sixteen hours.

References Cited by the Examiner

UNITED STATES PATENTS

| | | | |
|---|---|---|---|
| 816,271 | 3/06 | Steward | 106—65 |
| 2,543,548 | 2/51 | Henry | 106—65 X |
| 2,944,289 | 7/60 | Hall. | |
| 2,992,900 | 7/61 | Bovenkerk. | |
| 2,995,776 | 8/61 | Grardini et al. | |
| 3,075,245 | 1/63 | Bundy. | |
| 3,084,388 | 4/63 | Ballhausen. | |

ROBERT F. WHITE, *Primary Examiner.*
WILLIAM J. STEPHENSON, ALEXANDER H. BRODMERKEL, *Examiners.*